(12) United States Patent
Hsieh

(10) Patent No.: US 8,164,919 B2
(45) Date of Patent: Apr. 24, 2012

(54) MOTHERBOARD AND RELAY DEVICE THEREON

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 299 days.

(21) Appl. No.: 12/636,767

(22) Filed: Dec. 13, 2009

(65) Prior Publication Data

US 2011/0096520 A1 Apr. 28, 2011

(30) Foreign Application Priority Data

Oct. 27, 2009 (CN) .......................... 2009 1 0308886

(51) Int. Cl.
*H05K 7/00* (2006.01)

(52) U.S. Cl. .......................... 361/788; 361/791; 361/781

(58) Field of Classification Search .................. 361/781, 361/788, 791

See application file for complete search history.

(56) References Cited

U.S. PATENT DOCUMENTS

| | | | |
|---|---|---|---|
| 3,808,566 A * | 4/1974 | Thompson et al. ........... | 335/152 |
| 2009/0322346 A1* | 12/2009 | Cao ................................ | 324/555 |
| 2010/0220506 A1* | 9/2010 | Tai et al. ......................... | 363/49 |
| 2010/0264733 A1* | 10/2010 | Arimilli et al. ................. | 307/31 |

* cited by examiner

*Primary Examiner* — Yuriy Semenenko

(74) *Attorney, Agent, or Firm* — Altis Law Group, Inc.

(57) ABSTRACT

A motherboard includes a main body and two relay devices attached on the main body. The main body includes a signal output terminal, a signal input terminal, a first connector module, and a second connector module. Each relay device includes a circuit board, a relay, and a third connector module. The input terminal outputs an input signal to the corresponding relay via the first and the third connector modules in turn. The relay corresponding to the signal input terminal outputs the input signal to the signal output terminal via the third connector module corresponding to the signal input terminal, the first connector module, the second connector module and the third connector module corresponding to the signal output terminal in turn.

3 Claims, 5 Drawing Sheets

MOTHERBOARD AND RELAY DEVICE THEREON

BACKGROUND

1. Technical Field

The present disclosure relates to motherboards, and particularly to a motherboard having a relay device thereon.

2. Description of Related Art

In a motherboard, some relays, which satisfy need of voltage, current, and power of the motherboard, are adapted for the motherboard to manage power. Therefore, the motherboard works in an environment with a specific voltage, current, and power. When the motherboard is applied in other conditions, the relays need to be changed, and the motherboard needs to be amended, which is inconvenient.

DETAILED DESCRIPTION

Figure 1:
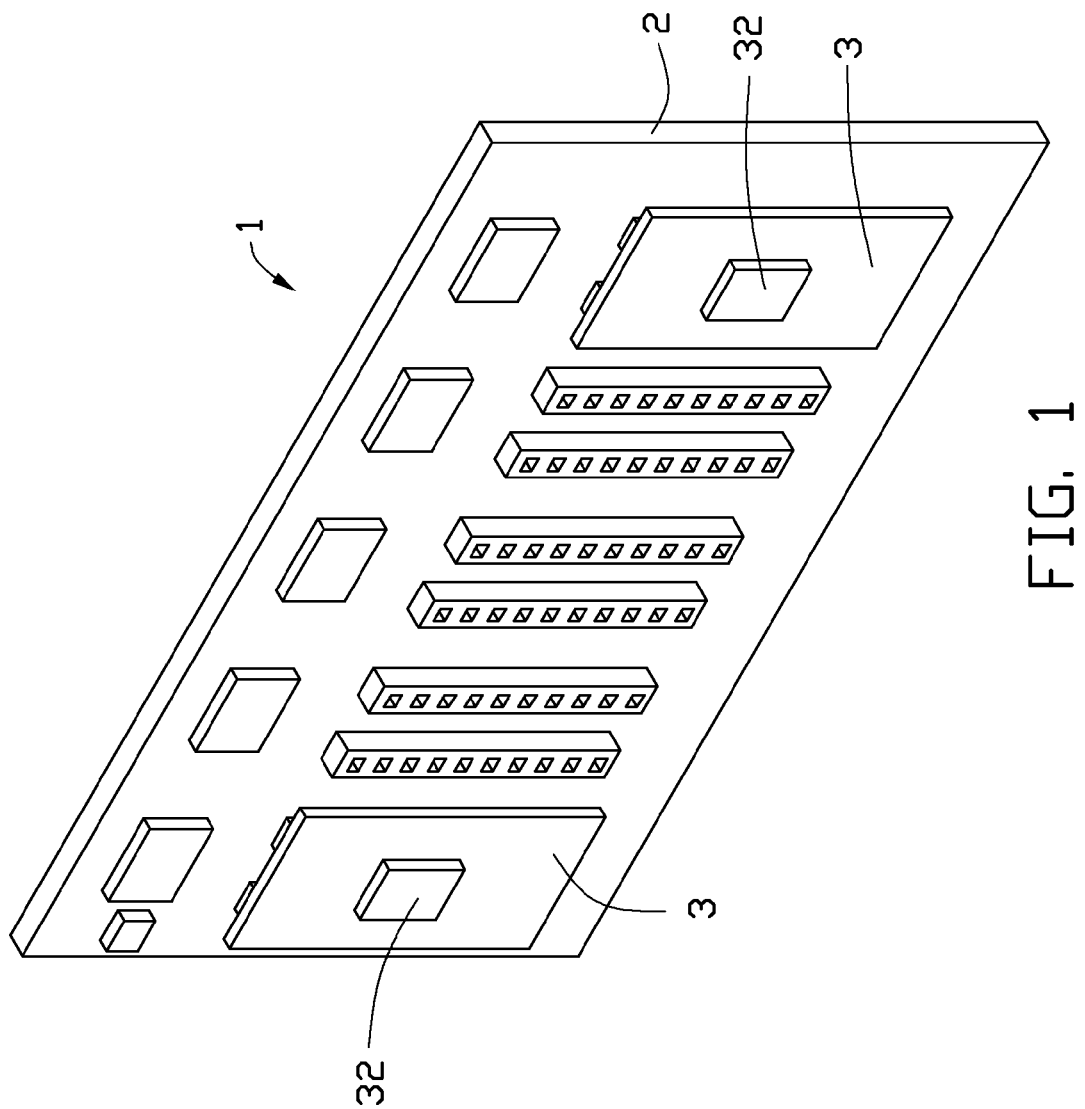
FIG. 1 is a schematic, isometric view of an embodiment of a motherboard, the motherboard includes a main body and two relay devices.

Referring to FIG. 1, an exemplary embodiment of a motherboard 1 includes a main body 2, and a plurality of relay devices 3 attached to the main body 2 (only two relay device 3 are shown in FIG. 1 as an example).

Figure 2:
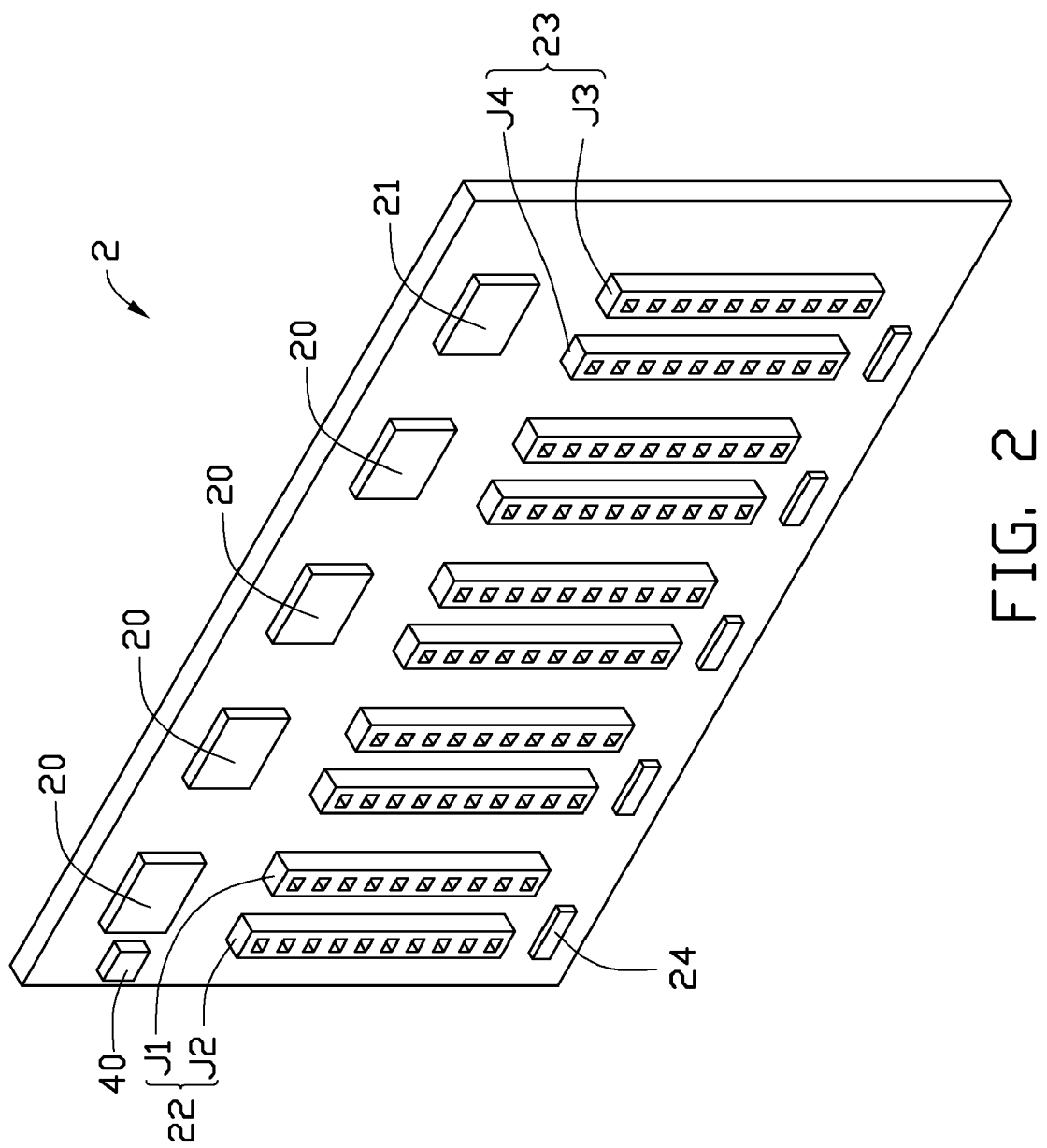
FIG. 2 is a schematic, isometric view of the main body of FIG. 1.

Referring to FIG. 2, the main body 2 includes a plurality of signal output terminals 20, a signal input terminal 21, a first-type connector module 23, a plurality of second-type connector modules 22, a plurality of electronic switches 24, and a power terminal 40. The first-type connector module 23 corresponds to the signal input terminal 21. The second-type connector modules 22 correspond to the signal output terminals 20. The plurality of electronic switches 24 correspond to the first-type and second-type connector modules 22, 23. The signal output terminals 20 are for outputting signals. The signal input terminal 21 is for inputting signals. The electronic switches 24 are controlled by a central processor unit (CPU) of the motherboard 1. Each of the second-type connector modules 22 includes two connectors J1, J2. The first-type connector module 23 includes two connectors J3, J4. Each of the connectors J1-J4 includes slots 1-10.

Figure 3:
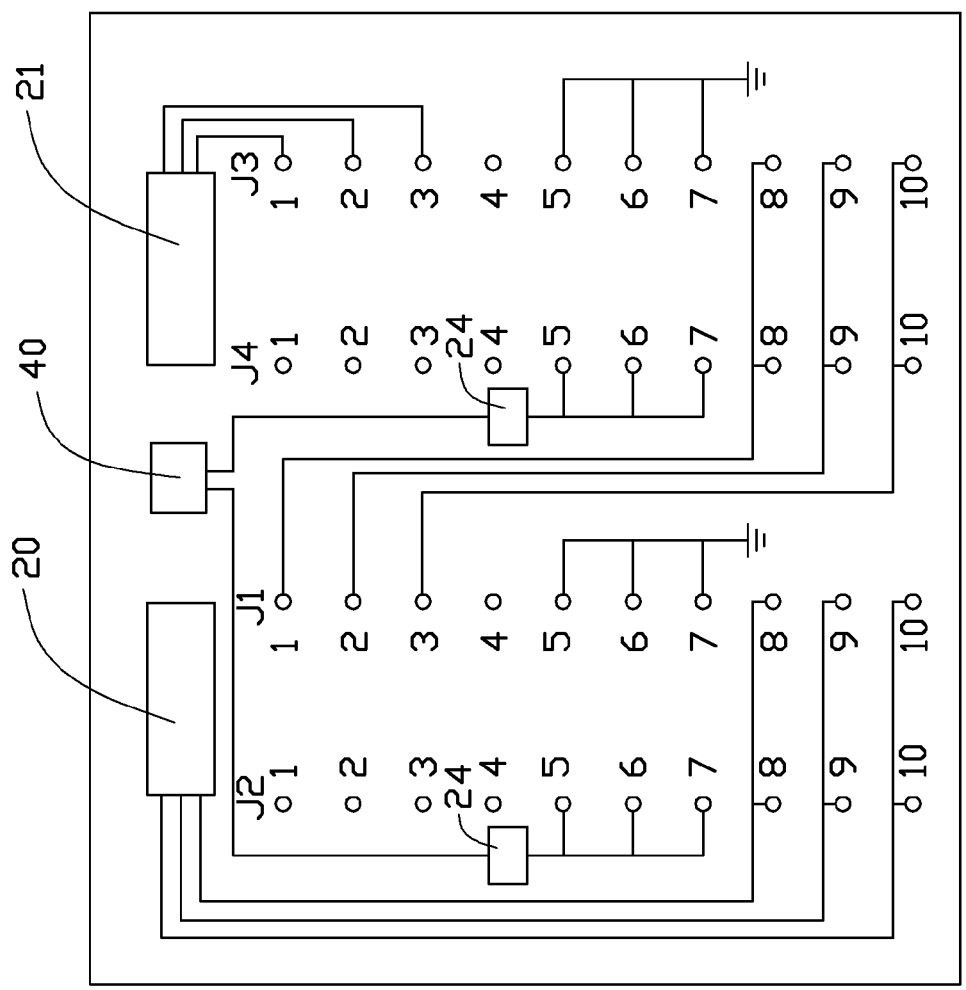
FIG. 3 is a circuit diagram of the main body of FIG. 1.

Referring to FIG. 3, a connection relationship among one of the second connector modules 22, the first connector module 23, the signal input terminal 21, and one of the signal output terminals 20 is taken as an example in the following description. The slots 1-3 of the connector J3 are connected to the signal input terminal 21 to receive an input signal. The slots 8-10 of the connectors J3, J4 are connected to the slots 1-3 of the connector J1. The slots 8-10 of the connectors J1, J2 are connected to the signal output terminal 20 correspondingly. The slots 5-7 of the connectors J1, J3 are grounded. The slots 5-7 of the connectors J2, J4 are connected to the power terminal 40 via one of the electrical switches 24 correspondingly. A connection among the other second connector modules 22, the first connector module 23, the signal input terminal 21, and the signal output terminal 20 is the same as the above-mentioned connection.

In the current embodiment, the motherboard 1 includes four signal output terminals 20, one signal input terminal 21, four second connector modules 22, and one first connector module 23. In other embodiments, the number of the signal output terminals 20, the signal input terminals 21, the second connector modules 22, and the first connector modules 23 may vary.

Figure 4:
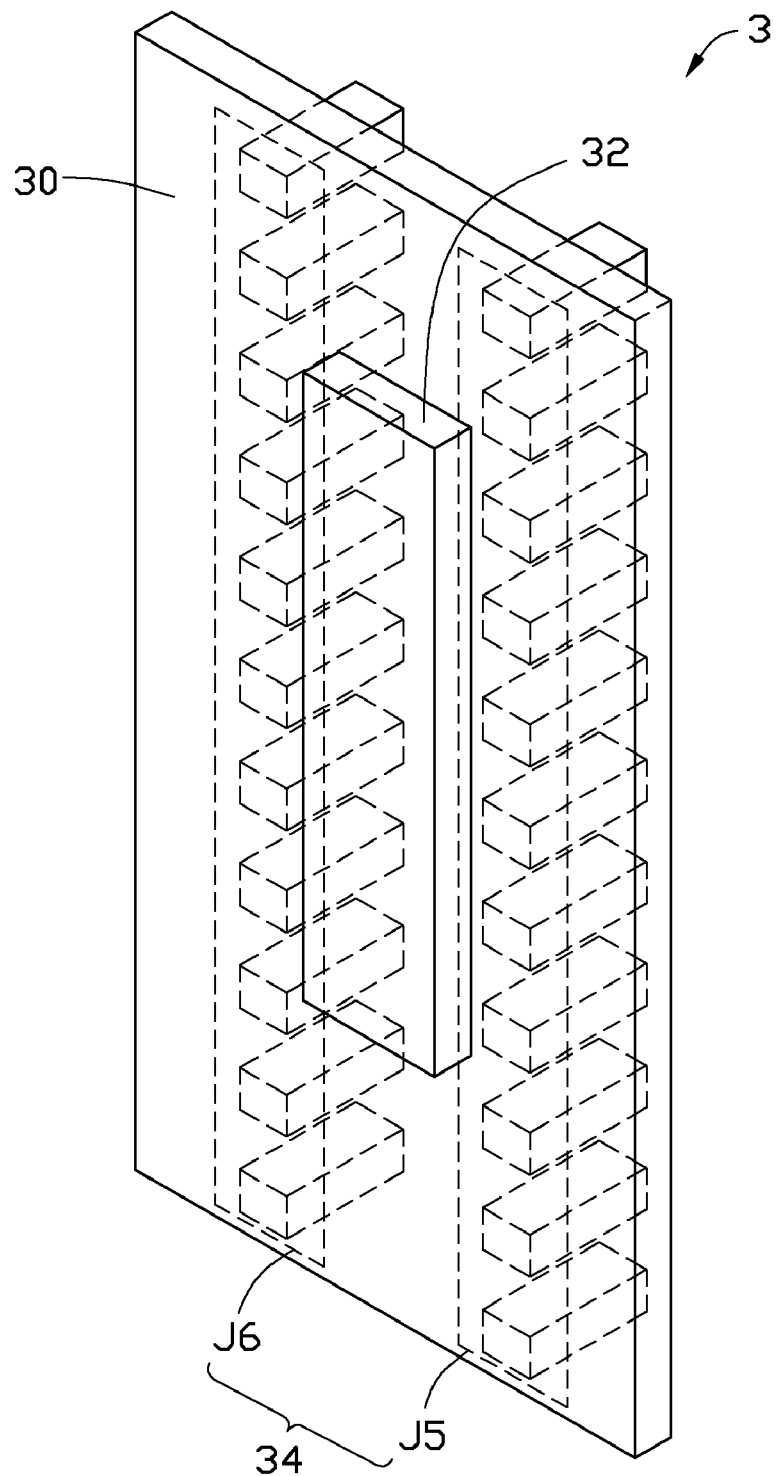
FIG. 4 is a schematic, isometric view of one of the two relay devices of FIG. 1.
Figure 5:
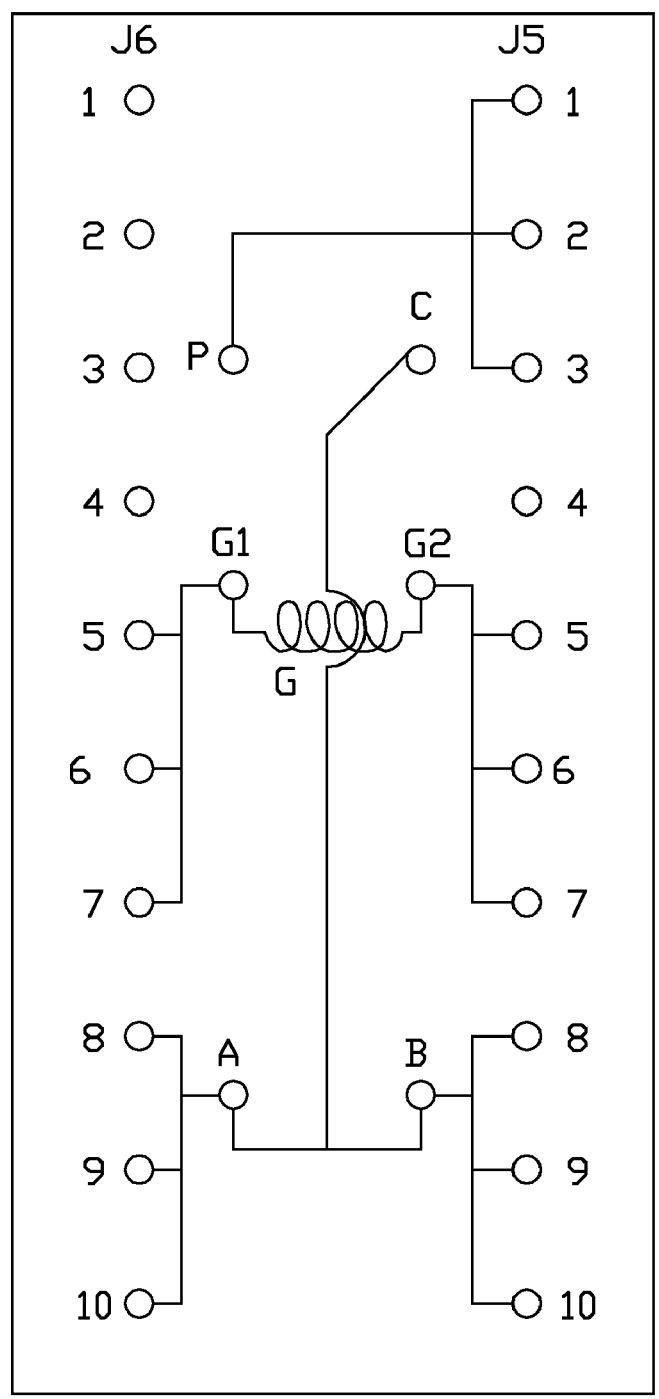
FIG. 5 is a circuit diagram of one of the two relay devices of FIG. 1.

Referring to FIGS. 4 and 5, each relay device 3 includes a circuit board 30, a relay 32 mounted on a first side the circuit board 30, and a third connector module 34 mounted on a second side of the circuit board 30 opposite to the first side. The third connector module 34 is used to couple with the second connector modules 22 and the first connector module 23. The third connector module 34 includes two connectors J5 and J6. Each of the connectors J5 and J6 includes pins 1-10, corresponding to the slots 1-10 of the connectors J1-J4. The relay 32 includes two output terminals A, B, a coil G, a closed contact P, an opened contact C, and a selector connected to the output terminals A, B. The relay 32 is a normally opened relay, i.e., the selector contacts the opened contact C normally. The coil G includes two terminals G1, G2. The two output terminals A, B of the relay 32 are connected to the pins 8-10 of the connectors J5, J6 correspondingly. The terminal G1 of the coil G is connected to the pins 5-7 of the connector J5. The terminal G2 of the coil G is connected to the pins 5-7 of the connector J6. The closed contact P of the relay 32 is connected to the pins 1-3 of the connector J5.

When two relay device 3 are attached to the main body 2, the connectors J5, J6 of one of the two relay device 3 couple with the connectors J1, J2 of one of the second-type connector module 22. The connectors J5, J6 of the other of the two relay device 3 couple with the connectors J3, J4 of the first-type connector module 23 (only two relay devices 3 are taken as an example for describing a work process among the signal input terminal 21, the signal output terminal 20, and the relay device 3). To output a signal, an electrical switch 24 corresponding to the signal output terminal 20 and an electrical switch 24 corresponding to the signal input terminal 21 are actuated. The two coils G of the two relays 32 are connected to the power terminal 40 and powered. Then, a magnetic field is produce by each of the two coils G. The selector of each relay 32 disengages from the opened contact C and contacts the closed contact P. The signal input terminal 21 inputs an input signal to the relay 32 corresponding to the signal input terminal 21 via the slots 1-3 of the connector J3 and the pins 1-3 of the connector J5 corresponding to the signal input terminal 21. The relay 32, corresponding to the signal input terminal 21, outputs the input signal to the slots 1-3 of the first connector J1 via the two output terminals A and B of the relay 32 corresponding to the signal input terminal 21, the pins 8-10 of the connectors J5, J6 corresponding to the signal input terminal 21, and the slots 8-10 of the connector J3, J4 in turn. The relay 32, corresponding to the signal output terminal 20 receives the input signal via the slots 1-3 of the connector J1, the pins 1-3 of the connector J5 corresponding to the signal output terminal 20. The relay 32, corresponding to the signal output terminal 20, outputs the input signal to the signal output terminal 20 via the two output terminals A and B of the relay 32 corresponding to the signal output terminal 20, the pins 8-10 of the connectors J5, J6 corresponding to the signal output terminal 20, the slots 8-10 of connectors J1 and J2 in turn.

In other embodiments, the number of the signal input terminals 21 can be changed. The signal input terminal 21 can be connected one of the slots 1-3 of the connector J3. One of the slots 5-7 of the connectors J1, J3 is grounded. One of the slots 5-7 of the connector J2, J4 is connected to the power terminal 40. One of the slots 8-10 of the connectors J3, J4 corresponding to the signal input terminal 21 is connected to one of the slots 1-3 of the connectors J1, J2 corresponding to the signal output terminals 20. One of the slots 8-10 of the connectors J1, J2 is connected to the corresponding signal output terminal 20. The connection relationship between the connectors J5, J6 of the relay device 3 can be correspondingly changed by changing the connection relationship between the connectors J1-J4 of the main body 2.

The relay devices 3, which are replaceable, are attached on the motherboard 1. When a power standard of the motherboard 1 is changed, the motherboard 1 does not need to be reconfigured manually. The relay devices 3 only needs to be replaced with other relay devices that satisfy the power standard of the motherboard 1. Therefore, a cost of changing the motherboard 1 can be avoided, and the flexibility of the motherboard 1 has been improved.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A motherboard comprising:
    a main body comprising:
        a signal output terminal;
        a signal input terminal;
        a first connector module corresponding to the signal input terminal, the first connector module comprising a first slot connected to the signal input terminal to receive an input signal, a second slot connected to a power source, and a third slot to output the input signal; and
        a second connector module corresponding to the signal output terminal, the second connector module comprising a first slot connected to the third slot of the first connector module to receive the input signal, a second slot connected to the power source, and a third slot connected to the signal output terminal to output the input signal; and
    two relay devices attached to the main body, each relay device comprising:
        a circuit board;
        a relay mounted on the circuit board, the relay comprising a closed contact, a coil, and an output terminal; and
        a third connector module attached on the circuit board and coupled with the first and second connector modules, the third connector module comprising a first pins corresponding to the first slots of the first and second connector modules and connected to the closed contact of the relay, a second pins corresponding to the second slots of the first and second connector modules and connected to the coil of the relay, and a third pins corresponding the third slots of the first and second connector modules and connected to the output terminal of the relay.

2. The motherboard of claim 1, wherein the first connector module comprises a first and a second connectors, the second connector module comprises a third and a fourth connectors, the third connector module comprises a fifth and a sixth connectors, the fifth connector comprises a first pins connected to the closed contact of the relay, a second pins connected to one terminal of the coil, and a third pins, the sixth connector comprises a first pins, a second pins connected to the other terminal of the coil, and a third pins, the output terminal of the relay is connected to the third pins of the fifth and sixth connectors, the third slots of the first and second connectors, corresponding the third pins of the fifth and the sixth connector, are connected to the first slots of the third connector, the second slots of the first and the third connector, corresponding to the second pins of the fifth connector is grounded, the second slots of the second and the fourth connectors, corresponding to the second pins of the sixth connector, is connected to the power terminal.

3. The motherboard of claim 1, further comprising a first electrical switch corresponding to the signal input terminal and a second electrical switch corresponding to the output terminal, the first and the second switches can be controlled to turn on the corresponding relay.

* * * * *